(No Model.)  2 Sheets—Sheet 2.
A. G. NEVILLE.
GLASS FURNACE.
No. 416,008. Patented Nov. 26, 1889.
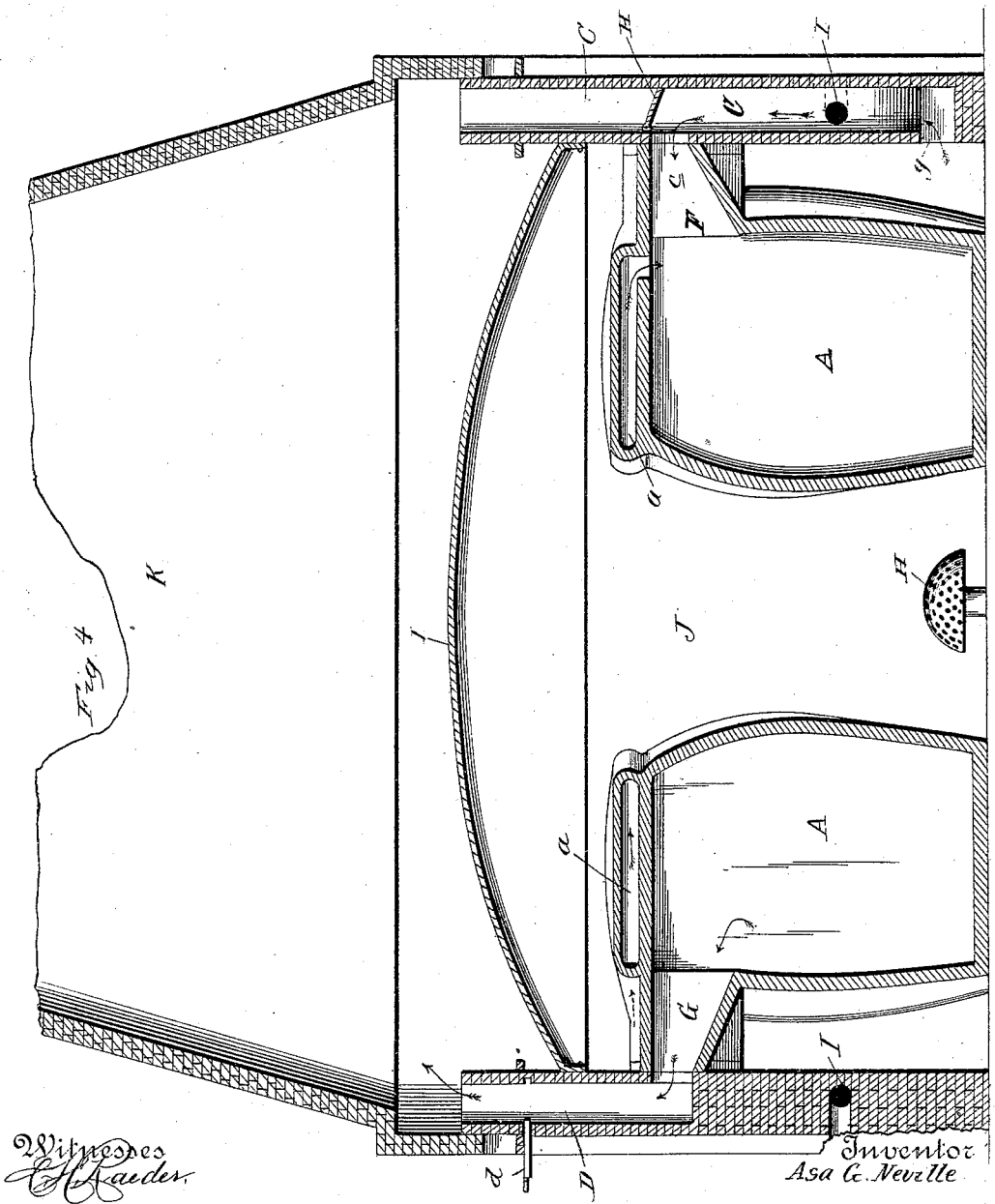
Witnesses
C. H. Raeder
Van Buren Hillyard
Inventor
Asa G. Neville
By his Attorneys

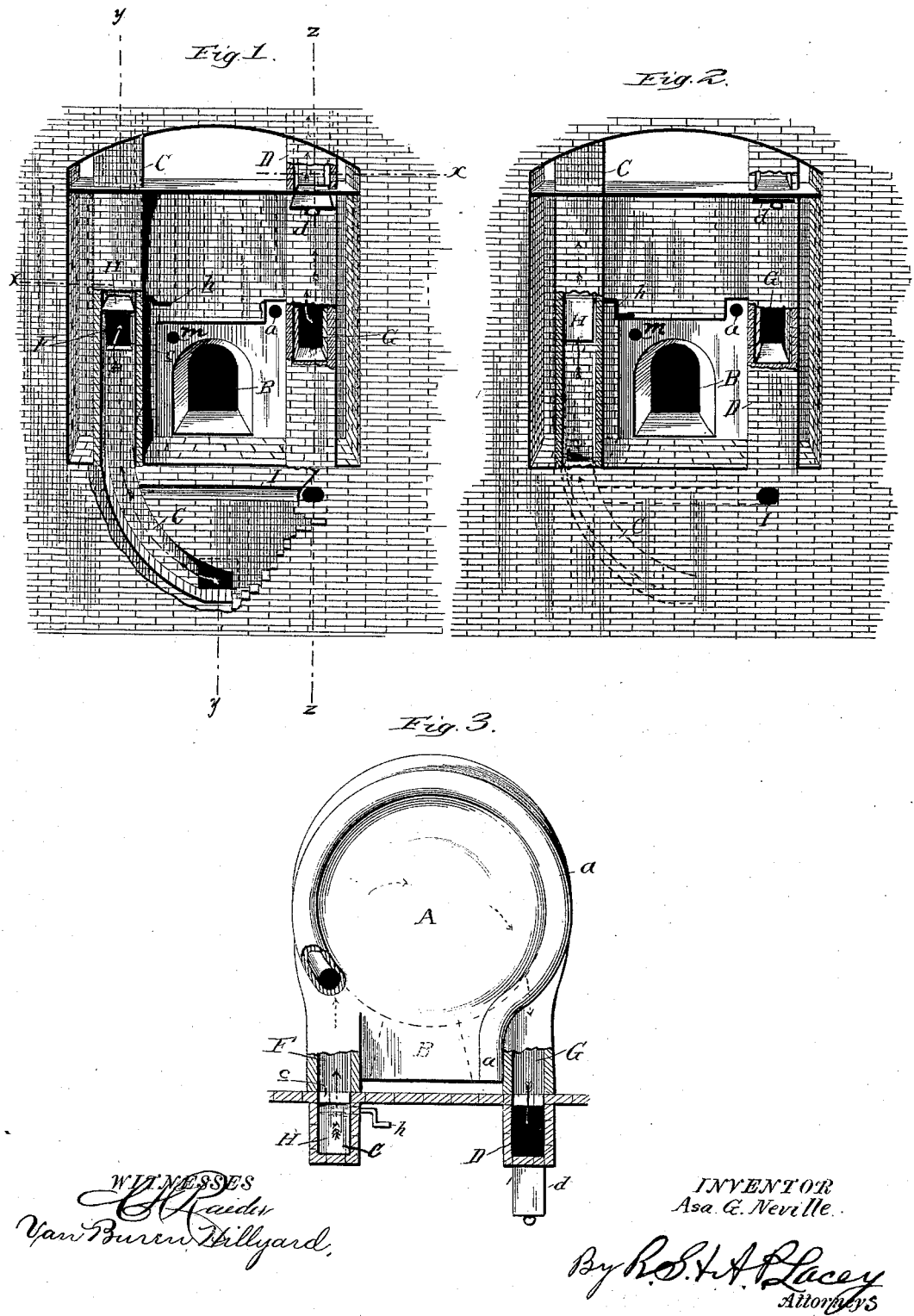

UNITED STATES PATENT OFFICE.

ASA G. NEVILLE, OF LAZEARVILLE, WEST VIRGINIA.

GLASS-FURNACE.

SPECIFICATION forming part of Letters Patent No. 416,008, dated November 26, 1889.

Application filed January 4, 1889. Serial No. 295,410. (No model.)

*To all whom it may concern:*

Be it known that I, ASA G. NEVILLE, a citizen of the United States, residing at Lazearville, in the county of Brooke and State of West Virginia, have invented certain new and useful Improvements in Glass-Furnaces; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to glass-furnaces, and is designed particularly as an improvement on the invention for which I made application for Letters Patent in the United States on or about the 28th day of November, 1888, Serial No. 292,083.

The improvement consists in the novel arrangement of the flues and dampers in the breast-wall of the furnace, whereby the flame can be compelled to circulate in and through the pot, and whereby the flame and all draft of whatever nature can be shut off from the pot when the glass is thoroughly melted, and in the peculiar construction and the combination of the parts, which will be hereinafter more fully described and claimed, and shown in the annexed drawings, in which—

Figure 1 is a front view, parts being broken away, of a furnace embodying my invention, showing the operation of the same; Fig. 2, a view similar to Fig. 1, showing the dampers closing the flues to the pot; and Fig. 3 is a section, parts being broken away, of the pot on the line X X of Fig. 1. Fig. 4 is a vertical section through the furnace, showing the pot on the left-hand side of the furnace as it appears in section on the line Y Y of Fig. 1 and the pot on the right-hand side of the furnace as it looks in section on the line Z Z of the said Fig. 1.

The pot A is substantially the same as that shown and described in my application hereinbefore referred to, except that the blower-passage *a* extends from one side of the pot to its opposite side, passing entirely around the crown of the pot. This passage *a* is connected with a suitable fan-blower, bellows, or other well-known means that will force a blast or current air through said passage into the pot. The inner end of this passage communicates with the interior of the pot opposite the flame-entrance passage C, and the blast of air meeting the incoming flame will force the latter down in contact with the contents of the pot. The flame, after performing its function, will depart by way of the egress-passage G. The ingress-passage F is on one side of the glory-hole B and the egress-passage G is on the opposite side; hence the flame is caused to sweep across the surface of the mass in the pot. The opening *m* to the left of the glory-hole B is the usual opening for testing the glass, a suitable rod being inserted through said opening to obtain a sample of the glass to ascertain its condition. The breast-wall of the furnace has two vertical flues C and D, one on each side of the glory-hole B. The flue C extends below the glory-hole B and communicates with the interior of the furnace at *g*, and also with the passage F in the pot through the opening *c*. The damper H, arranged above the opening *c*, is sufficiently large to close the flue when turned out and to close the opening *c* when turned down. The flue D communicates with the passage G in the pot and is provided with the damper *d*. The hot-air passage I in the breast-wall communicates at one end with the flue C and at its opposite end with the open air.

The operation of the furnace is as follows: The damper H being set to close the flue C and the damper *d* being drawn out, the flame will enter flue C and enter the pot through the passage F, and after acting on the substance in the pot will escape through the passage G and flue D. The air entering the passage I will be heated, and, mixing with the flame in the flue C, will produce a perfect combustion, and the flame as it enters the pot will be met by the blast of air from the passage *a*, which will cause it to circulate through the pot and come in contact with the contents of the pot. When the glass is melted, the damper H is turned down to close the opening *c* and the damper *d* pushed in to close the flue D. The damper H is operated in any suitable manner, preferably by the crank *h* on the end of the rod to which the damper is secured.

The passages F and G are enlarged at their inner ends, substantially as shown, to cause the flame to circulate in the pot close to the surface of the glass, thereby facilitating the process of reduction or of melting the glass.

In Fig. 4 is shown a vertical cross-section of a hydrocarbon-furnace embodying my invention, and in which H is the burner; J, the combustion or flame chamber; I, the deflector, and K the stack. The flues C and D communicate with the stack K above the deflector, as most clearly shown in Fig. 4.

Having thus described my invention, what I claim, and desire to secure by Letters Patent, is—

1. In a glass-furnace, the combination, with the pot having an ingress and an egress passage communicating with the interior thereof, of the breast-wall having two flues which communicate with the said passages in the pot, the flue communicating with the ingress-passage opening into the furnace-chamber, and the other flue communicating with the stack, substantially as described, for the purpose specified.

2. In a glass-furnace, the combination, with the pot having ingress and egress passages F and G, respectively, communicating with the interior of the pot, of the breast-wall having flues C and D, which communicate with the passages F and G, respectively, the flue C opening into the furnace-chamber and the stack, the flue D communicating with the stack, and the damper H in the flue C, for compelling the flame to enter the pot, and the damper d in flue D, for preventing the escape of heat, substantially as described.

3. The combination, with the pot having the passages F and G and having the blower-passage a, extending around the same and communicating with the pot near the terminus of the passage F, of the breast-wall having the flues C and D, the flue C communicating with the interior of the furnace and the flue D communicating with the stack, substantially as described.

4. In a glass-furnace, the combination of the pot having the passages F and G and having the blower-passage a, the breast-wall having the flues C and D, which communicate with the passages F and G, and having the air-passage I, the flue C opening into the furnace-chamber and the flue D communicating with the stack, and the dampers H and d, substantially as and for the purpose described.

In testimony whereof I affix my signature in presence of two witnesses.

ASA G. NEVILLE.

Witnesses:
 OLIVER BRYER,
 CHARLES W. E. NEVILLE.